(No Model.) 2 Sheets—Sheet 1.

S. WASHINGTON.
MOLD FOR MAKING GLASS ARTICLES.

No. 415,802. Patented Nov. 26, 1889.

Witnesses.
Philip M. Justice
Allen ...

Inventor.
S. Washington (No Model.) 2 Sheets—Sheet 2.

S. WASHINGTON.
MOLD FOR MAKING GLASS ARTICLES.

No. 415,802. Patented Nov. 26, 1889.

Witnesses
Inventor

UNITED STATES PATENT OFFICE.

SAMUEL WASHINGTON, OF MANCHESTER, ENGLAND.

MOLD FOR MAKING GLASS ARTICLES.

SPECIFICATION forming part of Letters Patent No. 415,802, dated November 26, 1889.

Application filed April 8, 1889. Serial No. 306,382. (No model.)

*To all whom it may concern:*

Be it known that I, SAMUEL WASHINGTON, a subject of Her Majesty the Queen of Great Britain, residing at Harphurey, Manchester, England, have invented certain new and useful Improvements in Molds for Making Glass Articles, of which the following is a specification.

This invention relates to the manufacture of glass bottles, jars, and similar vessels.

The object of the invention is to make at one operation a bottle having a finished or semi-finished lip or flange.

By this invention the mold in which the bottles are formed is made with a loose neck or collar adapted to slide upon the neck of the mold, the said movable collar being supported by springs in such manner as to leave a groove or cavity at the neck of the mold, into which the glass is forced in the operation of blowing, the said movable collar being forced downward while the glass is still pliable, and thus pressing the glass which has been forced into the cavity into a solid lip or flange of any desired shape or thickness.

To clearly explain my invention, reference is made to the accompanying drawings, in which—

Figure 1:
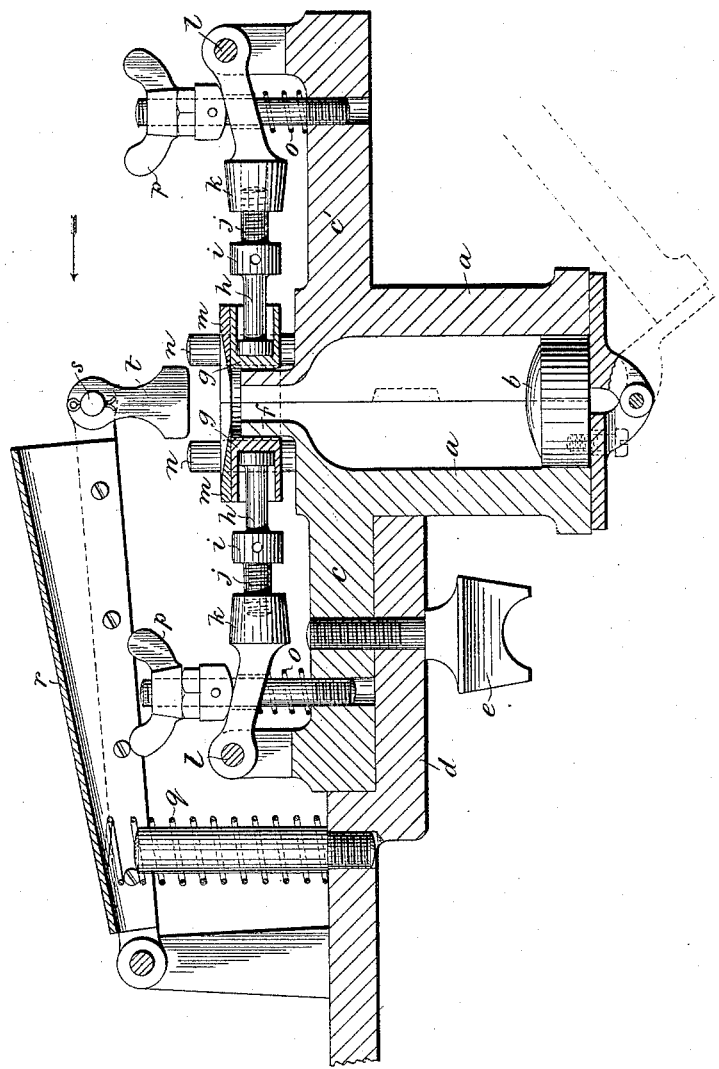
Figure 3:
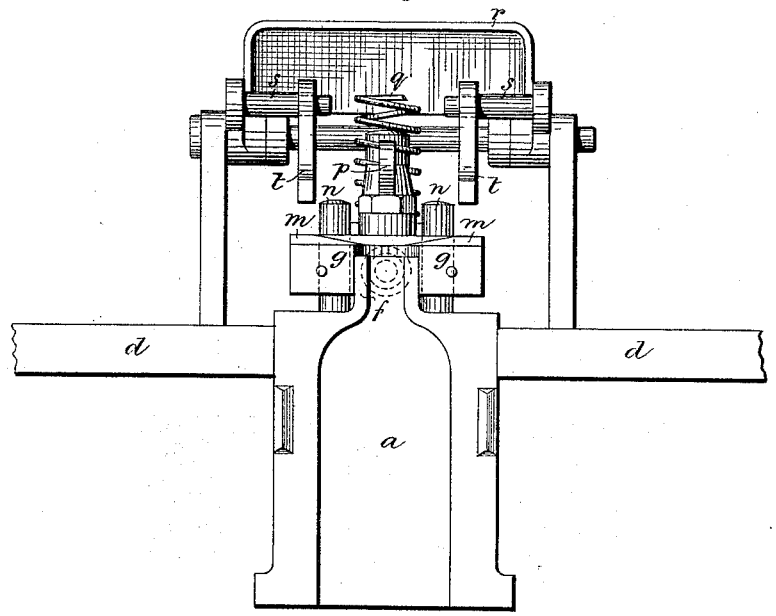
Figure 2:
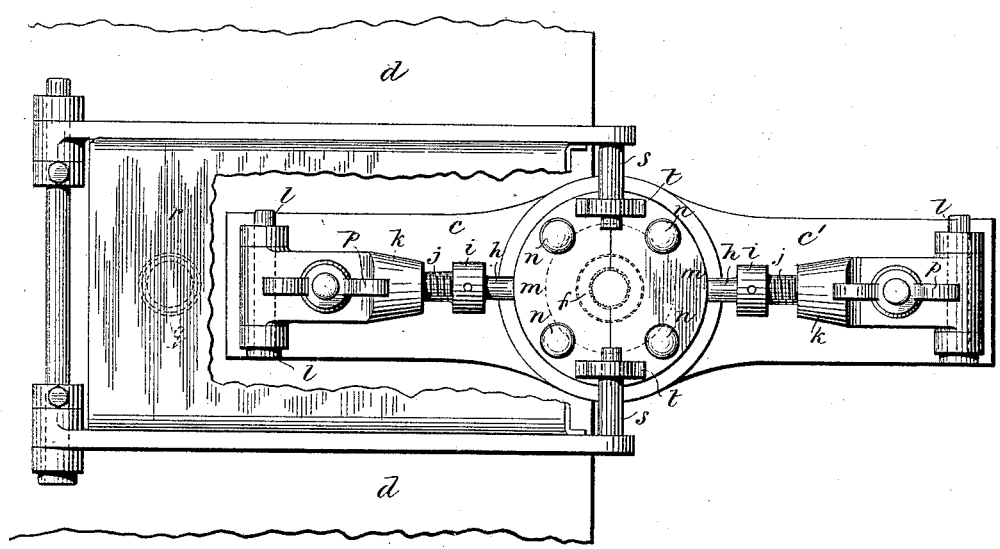

Figure 1 is a sectional elevation of an ordinary bottle-mold having my improvements applied thereto. Fig. 2 is a plan view of same; and Fig. 3 is a view looking at one face of the divided mold in the direction shown by the arrow, Fig. 1.

The mold $a$ is formed, as usual, in sections, which are suitably hinged together, and has the customary plug or "kick-up" $b$ therein.

$c$ and $c'$ are two arms attached to or forming part of the mold. The part $c$ may be attached to the bed-plate $d$ by a thumb-screw $e$, as shown.

Around each section of the neck $f$ of the mold I place a corresponding collar-section $g$, which is held up to same by a rod $h$, the head of which is capable of sliding in an opening in said collar. This rod has a boss $i$ thereon, having holes for receiving a tool for the purpose of turning same and terminates in a screw-thread $j$, which engages in a screwed socket $k$, carried by an arm, which is pivoted at the point $l$ to a short standard secured to the part $c$ (or $c'$.) By turning the boss $i$ the thread $j$ is screwed in and out of the socket $k$, so that the collar-section $g$, through the rod $h$, may be kept up to the neck of the mold. Each collar-section $g$ has secured thereto or forming part of it a plate $m$, having a tapered or knife edge overlapping the top of the mold-neck. Said collar-sections and plates are adapted to rise and fall upon pins $n$, secured to the parts $c$ and $c'$. By means of spiral springs $o$, which surround posts screwed into the arms $c$ $c'$, and which pass through the arms of the sockets $k$, the collar $g$ is held up, so that a groove or cavity is formed between the under side of plate $m$ and the top of the mold-neck. The normal size of this space is adjusted by the thumb-screw $p$ and other nuts, which regulate the pressure of the arm of socket $k$ on the spring $o$.

Secured in the bed-plate $d$ is a post carrying a spiral spring $q$, which serves to support a foot-plate $r$, pivoted on standards secured to the bed-plate. This foot-plate carries on the side bars of same, and pivoted on short pins $s$, hanging blocks $t$, which, when the foot-plate $r$ is forced down, are adapted to press upon the collar-sections.

The operation of the device is as follows: The mold being placed over a pit in the usual way, the blower takes the necessary amount of molten glass upon the end of his tube, and, after blowing it out into a small bulb, opens the mold, as indicated by dotted lines in Fig. 1, inserts the mass therein, closes it, and blows, the result being that the molten glass takes the shape of the mold, and is also forced into the groove or cavity between the plate $m$ and the top of the mold-neck, the glass being blown hollow therein, or in the shape of a fold. This done, the blower presses with his foot upon the plate $r$, which, through the blocks $t$, forces down the collar upon the mold-neck, the plate $m$ thus compressing the glass in the cavity into a solid lip or flange, the knife-edge on said plate $m$ being sufficient when the blow-pipe is lifted to cause the frosting to break off close to the lip and to leave the finished bottle in the mold or to only cling to it with sufficient force to enable the bottle to be lifted from the mold and removed to the annealing-furnace. The edge of the plate $m$ may have a knife-edge or finely-serrated teeth, as shown in the plan view, Fig. 2. If necessary, the inside edge of the flange may be ground, so as to remove the slight roughness left by breaking off the frosting.

Although I have shown means for supporting the collar g and for forcing the same down so as to compress or form a solid flange on the bottle, I do not confine myself to the construction of parts shown, as it is evident that the collar may be fixed and the mold movable.

Having now particularly described and ascertained the nature of my said invention and in what manner the same is to be performed, I declare that what I claim is—

1. The combination, with a mold for glass bottles and like articles having a contracted neck, of a movable collar surrounding the neck of the mold, held by spring-pressure at a suitable distance from the end thereof, and adapted to be moved on the mold-neck to compress the glass to form a flange or lip on the neck of the article, substantially as set forth.

2. The combination, with a mold for glass bottles and like articles, of a collar surrounding the neck of the mold and movable thereon in the direction of its length and provided with an inwardly-projecting plate or flange extending opposite the end of the mold-neck, and means for moving the said collar and its plate or flange to compress the glass and form a lip or flange on the neck of the article, substantially as set forth.

3. In combination with a mold for glass bottles and the like, a two-part collar surrounding the neck of the mold and adapted to form a flange or lip on the neck of the article being molded, and means for adjusting the parts of the collar toward and from the mold-neck, substantially as set forth.

4. In combination with a mold for glass bottles and the like, a two-part collar surrounding the neck of the mold and arranged to form a flange or lip upon the neck of the article being molded, and extensible link-connections between the parts of the collar and stationary supports, whereby the collar may be adjusted to the neck of the mold, substantially as set forth.

5. In combination with a mold for glass bottles and the like, a two-part collar surrounding the neck of the mold and movable thereon in the direction of its length, means for adjusting the parts of the collar to the neck of the mold, consisting of extensible links, and means for moving the collar in the direction of the length of the bottle-neck to compress the glass thereof and form thereon a flange or lip, substantially as set forth.

6. The combination, with a mold for glass bottles and the like, of a collar surrounding the neck of the mold and movable thereon in the direction of its length to compress the glass and form a flange or lip on the neck of the bottle, and a foot-plate provided with blocks arranged to be brought to bear upon the said collar to move it, substantially as set forth.

In testimony whereof I have hereunto set my hand in the presence of two subscribing witnesses.

S. WASHINGTON.

Witnesses:
PHILIP M. JUSTICE,
ALLEN N. JONES.